(12) United States Patent
Gagnon

(10) Patent No.: US 8,055,997 B2
(45) Date of Patent: Nov. 8, 2011

(54) SYSTEM AND METHOD FOR IMPLEMENTING DYNAMIC FORMS

(75) Inventor: Martin J. Gagnon, Overland Park, KS (US)

(73) Assignee: Lexmark International Technology, S.A., Geneva (CH)

( * ) Notice: Subject to any disclaimer, the term of this patent is extended or adjusted under 35 U.S.C. 154(b) by 1078 days.

(21) Appl. No.: 11/768,058

(22) Filed: Jun. 25, 2007

(65) Prior Publication Data

US 2008/0126396 A1 May 29, 2008

Related U.S. Application Data

(60) Provisional application No. 60/816,580, filed on Jun. 26, 2006.

(51) Int. Cl.
*G06F 17/00* (2006.01)
*G06F 17/20* (2006.01)
*G06F 17/21* (2006.01)
*G06F 17/22* (2006.01)
*G06F 17/24* (2006.01)

(52) U.S. Cl. ......... 715/222; 715/236; 715/237; 715/239

(58) Field of Classification Search .................. 715/236, 715/237, 239, 222
See application file for complete search history.

(56) References Cited

U.S. PATENT DOCUMENTS

| | | | |
|---|---|---|---|
| 6,996,781 B1 * | 2/2006 | Myers et al. .................. | 715/763 |
| 7,225,399 B2 * | 5/2007 | Watson ......................... | 715/210 |
| 7,308,458 B2 * | 12/2007 | Vincent, III ............................ | 1/1 |
| 7,356,764 B2 * | 4/2008 | Radja et al. .................... | 715/234 |
| 7,798,417 B2 * | 9/2010 | Snyder et al. ................. | 235/494 |
| 7,831,904 B2 * | 11/2010 | Kim ............................... | 715/234 |
| 2003/0126129 A1 * | 7/2003 | Watson ............................... | 707/6 |
| 2004/0006741 A1 * | 1/2004 | Radja et al. .................... | 715/513 |
| 2004/0268240 A1 * | 12/2004 | Vincent, III ................... | 715/513 |
| 2005/0060317 A1 * | 3/2005 | Lott et al. ......................... | 707/10 |
| 2006/0143562 A1 * | 6/2006 | Seurig et al. .................. | 715/513 |
| 2008/0072164 A1 * | 3/2008 | Park .............................. | 715/762 |
| 2008/0126396 A1 * | 5/2008 | Gagnon ........................ | 707/102 |
| 2008/0195934 A1 * | 8/2008 | Kim .............................. | 715/235 |
| 2009/0083287 A1 * | 3/2009 | Bell et al. ......................... | 707/10 |

OTHER PUBLICATIONS

Kiselyov et al. "XML, XPATH, XSLT implementations vs SXML, SXPath, and SXSLT" < * = no date available>.*

* cited by examiner

*Primary Examiner* — Douga Hutton, Jr.
*Assistant Examiner* — Soumya Dasgupta

(57) ABSTRACT

A system and method is provided for implementing a dynamic form using file data retrieved from an external file source. An application executing on a server computer is responsive to a form request received from a user system computer to transform the retrieved file data into a format that includes new input elements. Unique namespaces are assigned to each of the new input elements, and the requested form and transformed file data are transmitted to the user system. The application is configured to create new XML file data that is mapped to the original XML file data in response to a user of the user system inputting data into the form. The new XML file data is compared to the original XML file data to identify missing elements. Missing elements are inserted into the new XML file data, and the new XML file data is stored in a memory.

40 Claims, 10 Drawing Sheets

| ADVISOR FIRST NAME | JOHN |
| ADVISOR LAST NAME | SMITH |
| STUDENT FIRST NAME | MARTY |
| STUDENT LAST NAME | JONES |

SUBMIT

SYSTEM AND METHOD FOR IMPLEMENTING DYNAMIC FORMS

RELATED APPLICATION

This application claims the benefit of the filing date of U.S. Provisional Application No. 60/816,580, entitled Implementing E-Forms Using XSLT, filed Jun. 26, 2006, the entire contents of which are incorporated herein by reference.

FEDERALLY SPONSORED RESEARCH OR DEVELOPMENT

Not Applicable.

COMPACT DISK APPENDIX

Not Applicable.

BACKGROUND OF THE INVENTION

The Internet is being used more and more by businesses, organizations, and institutions to provide web sites that allow interested parties to purchase goods and/or to participate in services remotely. In fact, the entire process of purchasing goods and selecting services is completed using a personal computer or other computing device that is connected to a communication network, such as the Internet.

Typically, web sites provide electronic documents, such as electronic forms ("forms"), that allow a user to view products or services and to select and/or designate products or services for purchase. Such forms are commonly defined using a hypertext markup language ("HTML"), which has been developed for desktop computers and fast and stable wired networks and/or for wireless computing devices connected to a wired network. Web browsing applications that are executable on desktop computers typically support extended HTML features, such as frames, cascading style sheets ("CSS"), and active content, such as, for example, JavaScript® or Java®, as well as other proprietary extensions.

HTML includes various input elements that are used to define entry fields in a form, such as a data input field. Each of the various input elements is assigned a name attribute to distinguish it from another input element. The user inputs data into the input fields of the form or changes data displayed in the input fields of the form. The input values are "submitted" to a Uniform Resource Locator ("URL") associated with the web site. The data routed to the URL consists of name/value pairs such that the name of each input element is used to identify the values entered in the corresponding input field of the form.

The data displayed in the input fields on some forms is hard coded into the HTML. Such forms are often referred to as "static" because they have a fixed layout that includes fields, text and graphics. In contrast, "dynamic" forms retrieve data from an external data source, such as a relational database or an eXtensible Markup Language ("XML") file that is called by the HTML, and the user can change the appearance of "dynamic" forms. Unfortunately, however, when a form is created using an eXtensible Stylesheet Language Transform (XSLT) using data from an XML file as the external data source, the user cannot update/save data modifications to external data source from which the original data was retrieved.

SUMMARY OF THE INVENTION

In one aspect, the present invention is directed to a system and method for extracting data for insertion into a dynamic form that can be displayed inside a HTML browser without the use of a plug-in. Templates are used to allow the complex mapping between HTML input fields and an external data source, such as an XML file. Document Object Model ("DOM") event processing is used to dynamically add and remove HTML elements. New HTML elements are automatically mapped to the original XML file with name spaces generated based on existing XML elements in the XML file. Finally, the XML data in the original XML file is updated based on mappings between it and the data values inputted into the input fields of the dynamic form.

According to another aspect, a computerized system for implementing a dynamic form in response to a form request received at a server computer from a user system computer is provided. The form request comprises information identifying a transformation file that defines the dynamic form and references original file data. The original file data comprises at least one data element defining a data value for a corresponding input field of the dynamic form. The system comprises a dynamic form generation application that comprises a pre-processing component. The preprocessing component comprises a file transformation module to retrieve the original file data and to create a dynamic document file that comprises at least one input element corresponding to the at least one element in the original file data. The pre-processing component also comprises a namespace assignment module to assign a unique namespace to the at least one input element in the dynamic document file. The pre-processing component also comprises a user interface module to transfer the dynamic document file to the user system computer. The system further comprises a user system application that executes on the user system computer to read the dynamic document file along with the mapping of the dynamic form elements and the XML file to generate the dynamic form for display. The dynamic form displaying the data value in the corresponding input field for the at least one input element.

According to another aspect, a computerized system for implementing a dynamic form in response to a form request received from a user system computer is provided. The form request comprises information identifying a transformation file that defines the dynamic form and references original file data. The original file data comprises at least one data element defining a data value for a particular input field of the form. The system comprises a pre-processing component that comprises a file transformation module to retrieve the original file data and to create a dynamic document file that comprises at least one input element corresponding to the at least one data element. The pre-processing component further comprises a namespace assignment module to assign a unique namespace to the at least one input element in the dynamic document file and to generate a document object model (DOM) representation of the dynamic document file. The pre-processing component further comprises a user interface module to transmit the dynamic document file for reception by the user system computer. The system further comprises a user system application executable on the user system computer to generate the dynamic form for display. The dynamic form displays the data value in the particular input field for the at least one data element corresponding to the at least one input element. The system further includes a user interface configured to receive a user input defining new file data. The new file data defining a new data value for the particular input field. The user system application is configured to generate an update request based on the user input. The system further comprises a post-processing component that comprises a tree creation module configured to create a tree structure from the namespace's, which map the DOM elements to the xml elements. The tree structure defines a hierarchy of the at least one input element in the dynamic document file and comprises the new data value corresponding to the particular input field identified. The post-processing component further comprises a mapping module to create a new file comprising the new file data based on the created tree structure. The post-processing component further comprises an examination module to compare the new file data to the original file data to identify data elements that are missing from the new file data and to modify the new file to include missing data elements. The post-processing component further comprises a storage module to store the new file as modified by the examination module in a memory.

According to another aspect, a computerized method for implementing a dynamic form in response to a form request from a user system computer is provided. The dynamic form comprises at least one input field for displaying file data. The form request identifies a transformation file that defines the dynamic form and references original file data. The original file data comprises at least one data element defining a data value for a particular input field of the form. The method comprises retrieving the transformation file. The method further comprises retrieving the original file data referenced in the transformation file to populate the at least one input field in the dynamic form. The method further comprises creating a dynamic document file that comprises at least one input element corresponding to the at least data one element in the original file data. The method further comprises assigning a unique namespace to each input element in the dynamic document file. The method further comprises transferring the dynamic document file to the user system computer. The method further comprises processing, at the user system computer, the dynamic document file to display the dynamic form.

According to another aspect, a system comprising components executable with at least one processor for creating a dynamic document file displayable as a dynamic form in response to a form request is provided. The form request comprises information identifying a transformation file that defines the dynamic form and references original file data. The original file data comprises at least one data element defining a data value for a corresponding input field of the dynamic form. The system comprises a pre-processing component comprising a file transformation module to retrieve the original file data and to create a dynamic document file comprising at least one input element corresponding to the at least one data element in the original file data. The pre-processing component further comprises a namespace assignment module to assign a unique namespace to the at least one input element in the dynamic document file. The pre-processing component further comprises a user interface module to transmit the dynamic document file for reception by a processing device. The dynamic document file is displayable as a dynamic form.

According to another aspect, a method for creating a dynamic document file displayable as a dynamic form is provided. The method includes retrieving a transformation file defining the dynamic form and referencing original file data. The original file data comprises at least one data element defining a data value for a corresponding input field of the dynamic form. The method further includes retrieving the original file data. The method further includes creating a dynamic document file that comprises at least one input element corresponding to the at least one data element in the original file data. The method further includes assigning a unique namespace to the at least one input element in the dynamic document file. The method further includes processing the dynamic document file to display the dynamic form.

According to another aspect, a system comprising components executable with at least one processor for creating a dynamic document file displayable as a dynamic form in response to a form request is provided. The form request comprises information identifying a transformation file that defines the dynamic form and references original file data. The original file data comprises at least one data element defining a data value for a corresponding input field of the dynamic form. The system comprises a pre-processing component that comprises a file transformation module configured to execute an eXtensible Stylesheet Language Transform (XSLT) code to retrieve the original file data from an extensible Markup Language (XML) file and to create a dynamic document file comprising at least one input element corresponding to the at least one data element in the original file data. The pre-processing component further comprises a namespace assignment module configured to execute an XSLT template to dynamically embed a unique namespace for the at least one input element in the dynamic document file module. The pre-processing component further comprises a user interface module to transmit the dynamic document file for reception by a processing device. The dynamic document file is displayable as a dynamic form.

According to another aspect, a method for creating a dynamic document file displayable as a dynamic form is provided. The method comprises retrieving a transformation file defining the dynamic form and referencing original extensible Markup Language (XML) file data. The original XML file data comprising at least one data element defining a data value for a corresponding input field of the dynamic form. The method further comprises using an eXtensible Stylesheet Language Transform (XSLT) to retrieve the original XML file data from the XML file. The method further comprises creating a dynamic document file that comprises at least one input element corresponding to the at least one data element in the original file data. The method further comprises assigning a unique namespace to the at least one input element in the dynamic document file and dynamically embedding the unique namespace for the at least one input element in the dynamic document file with an XSLT template. The method further comprises transmitting the dynamic document file.

According to another aspect, a system comprising components executable with at least one processor for creating a dynamic document file displayable as a dynamic form in response to a form request is provided. The form request comprising information identifying a transformation file that defines the dynamic form and references original file data. The original file data comprising at least one data element defining a data value for a corresponding input field of the dynamic form. The system comprises a pre-processing component that comprises a file transformation module to retrieve the original file data and to create a dynamic document file comprising at least one input element corresponding to the at least one data element in the original file data. The pre-processing component further comprises a namespace assignment module to assign a unique namespace to the at least one input element in the dynamic document file and to generate a document object model (DOM) representation of the dynamic document file based on the assigned unique namespace of the at least one input element. The pre-processing component further comprises a user interface module to transmit the dynamic document file for reception by a processing device. The dynamic document file is displayable as a dynamic form. The system further comprises a post-processing component that comprises a tree creation module to create a tree structure based on the DOM in response to an update request. The update request defining a new data value for a particular input field included in the dynamic form. The tree structure defining a hierarchy of the at least one input element based on the determined level of nesting and comprising the data value for the at least one data element and the new data value for the particular input field identified in the update request. The post-processing component further comprises a mapping module to create a new file comprising the new file data based on the created tree structure. The post-processing component further comprises an examination module to compare the new file data to the original file data to identify data elements that are missing from the new file data and to modify the new file to include missing data elements. The post-processing component further comprises a storage module to store the new file as modified by the examination module in a memory.

BRIEF DESCRIPTION OF THE DRAWINGS

FIG. 1B is a screen shot of a static form;

DETAILED DESCRIPTION

Figure 1A:
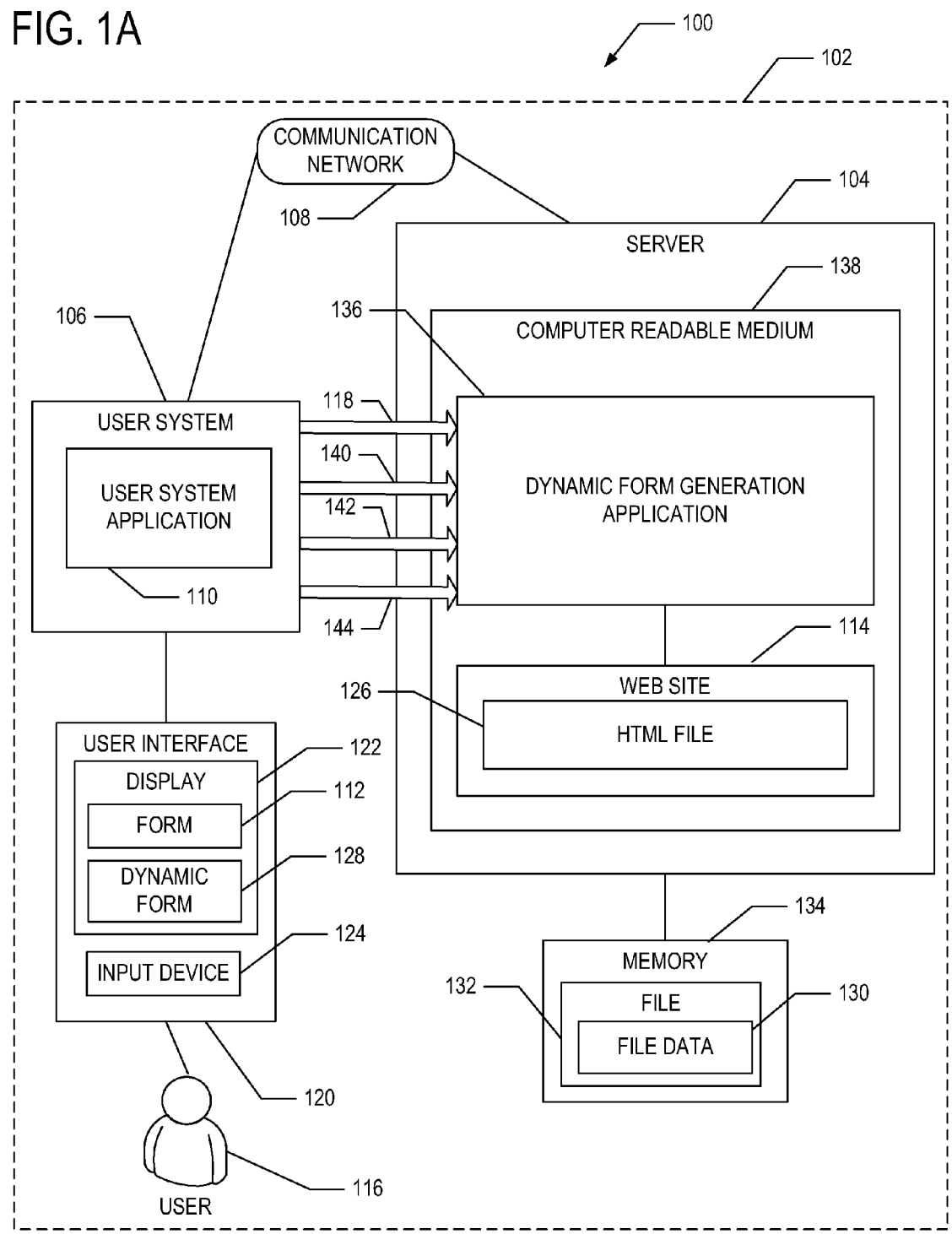
FIG. 1A is a block diagram illustrating an operating environment in which aspects of a dynamic form generation system may be implemented.

Referring to the drawings, a system and method for implementing a dynamic form generation system 100 is generally indicated in FIG. 1A. The dynamic form generation system 100 includes an operating environment 102 with a server 104 and a user system computer ("user system") 106 that communicates with the server 104 over a communication network 108. In one example, the communication network 108 is the Internet, an intranet, or another communication network. In this example, the server 104 and the user system 106 communicate using a Hyper Text Transfer Protocol ("HTTP"). For purposes of illustration, the dynamic form generation system 100 is described herein with reference to example codes and file data shown in the Appendix.

A user system application 110 may be executed on the user system 106 for communicating with the server 104 in order to interact with a web site 114. The web site 114 can be located on other servers in other aspects The web site 114 is typically a software system that provides a particular service or content to a user 116 of the user system 106 via the communication network 108. For example, a user 116 may use a web site 114 associated with a particular educational institution to interact with a form 112 that enables the student to register for courses, view course grades, and/or view course information. The user system application 110 is, for example, a web browsing application that is responsive to input received from the user 116 to generate a form request, as indicated by arrow 118, to retrieve a desired form 112 from the web site 114.

In one example, the user 116 uses a user-interface (UI) 120 to generate the form request 118. The UI 120 may include a display 122, such as a computer monitor, for viewing the form 112, and an input device 124, such as a keyboard or a pointing device (e.g., a mouse, trackball, pen, touch pad, or other device), for interacting with data displayed on the form 112.

The user system application 110 enables the user to access search engines on the communication network 108 to identify a web site 114 that provides a desired product or service. For example, the user 116 uses the input device 120 to define search terms and initiate a search to display a list of search results on the display 122. The user 116 uses the UI 120 to select a particular item from the list of search results, and the user system application 110 displays a web page associated with the web site 114 that corresponds to the selected item. The user 116 uses the UI 120 to interact with the web page to generate the form request 118 to display a form 100 associated with the web site 114 on the display 122.

For example, the web page (not shown) displayed on the display 122 may include an option control that enables the user to view an order form to order a product or service. The user system application 110 generates the form request 118 in response to the user 116 selecting the option control. Notably, the web page may be the form 112. Alternatively, the user 116 can generate the form request 118 by using the input device 124 to enter, for example, a Uniform Resource Locator ("URL") address that corresponds to a location of a file on the Internet or other network that defines the particular form 112.

The form 112 may be of one or more types. A common type of form 112 used by web sites is the standard HTML form defined by an HTML file 126.

The HTML file 126 consists of various HTML code elements that correspond to content contained within a set of tags. FIG. 1B depicts a form 112 that can be used, for example, to view class information, such as a student name and an advisor name for a particular student associated with an educational institution.

Example 1 in the Appendix shows an example of HTML code that can be used to define the form 112 shown in FIG. 1B. That HTML code includes input elements that are defined by start and end <input> tags. As described above, the input elements define input fields to display in the form 112. For example, the input element <INPUT> type="text" name="advisor-first-name" value="John"></INPUT><br> defines a text type input field that identifies the first name of the Advisor, John. In this example, the data (e.g., the names of the advisor and the student) that populates the form 112 shown in FIG. 1B is hard coded into the HTML code. In other words, the same HTML file that defines the various input elements also defines the values of those input elements. This type of form 112 is referred to as a "static form."

However, it is often preferable to display a dynamic form 128. The dynamic form 128 is defined by a dynamic document file that retrieves data from an external data source, such as a relational database or a file that is called by HTML code or some other language. One method for designing a dynamic form involves using a transformation language, such as an eXtensible Stylesheet Language (XSL) to retrieve file data 130 from an XML file 132 to create a dynamic document file, which is essentially an HTML document file. The XML file 132 includes various elements that define data values for input elements included in the XSL. This is also known as an XSL Transformation ("XSLT") and refers to the language used to retrieve information from the XML file 132.

When the dynamic document file is transferred to the user system 106, the user system application 110 reads the dynamic document file and displays the dynamic form 128 on the display 122. When using XSLT, the presentation or look of the dynamic form 128 is described in an HTML file, and the file data 130 used to populate the dynamic form 128 is retrieved from the XML file 132. Example 2 in the Appendix shows an example of file data 130 included in an XML file 132 named "School_Content.xml," and Example 3 in the Appendix shows an example of an XSL code that can be used to retrieve file data 130 from the School_Content.xml file to create a dynamic form 128.

The server has memory 134 on which data is stored, including the file 132 and file data 130 and other files and file data. By retrieving file data 130 from an external source, such as the memory 134, there is no need to modify the HTML code associated with the particular form each time there is a change in information associated with the dynamic form 128. In addition, the information in the external source can be changed with little, if any, interruption of the ability of the user 116 to interact with the dynamic form 128.

The server 104 receives a form request 118 from the user system 106. In response, a dynamic form generation application 136 creates a dynamic document file that, when processed, implements a dynamic form 128 that changes appearance based on user input. Moreover, the dynamic form 128 allows the user to modify file data displayed on the form 128 and to store the modified file data in the file 132 from which the original file data 130 was retrieved. As a result, aspects of the dynamic form generation system 100 provide an improved dynamic form generation application 136 that efficiently and easily provides user customizable dynamic forms 128. Although the dynamic form generation system 100 is described herein in the context of implementing forms using XSLT, it is contemplated that the principles of the dynamic form generation system 100 can be applied to other data extraction techniques.

In one aspect, the server 104 may include a general purpose-computing device, such as a computer executing computer-executable instructions. The computing device typically has at least some form of computer readable media (e.g., CRM 138), which includes volatile and/or nonvolatile media, removable and/or non-removable media, and may be any available medium that may be accessed by the general purpose-computing device. The server 102 includes one or more processors to process a form request and generate a dynamic document file.

Figure 2A:
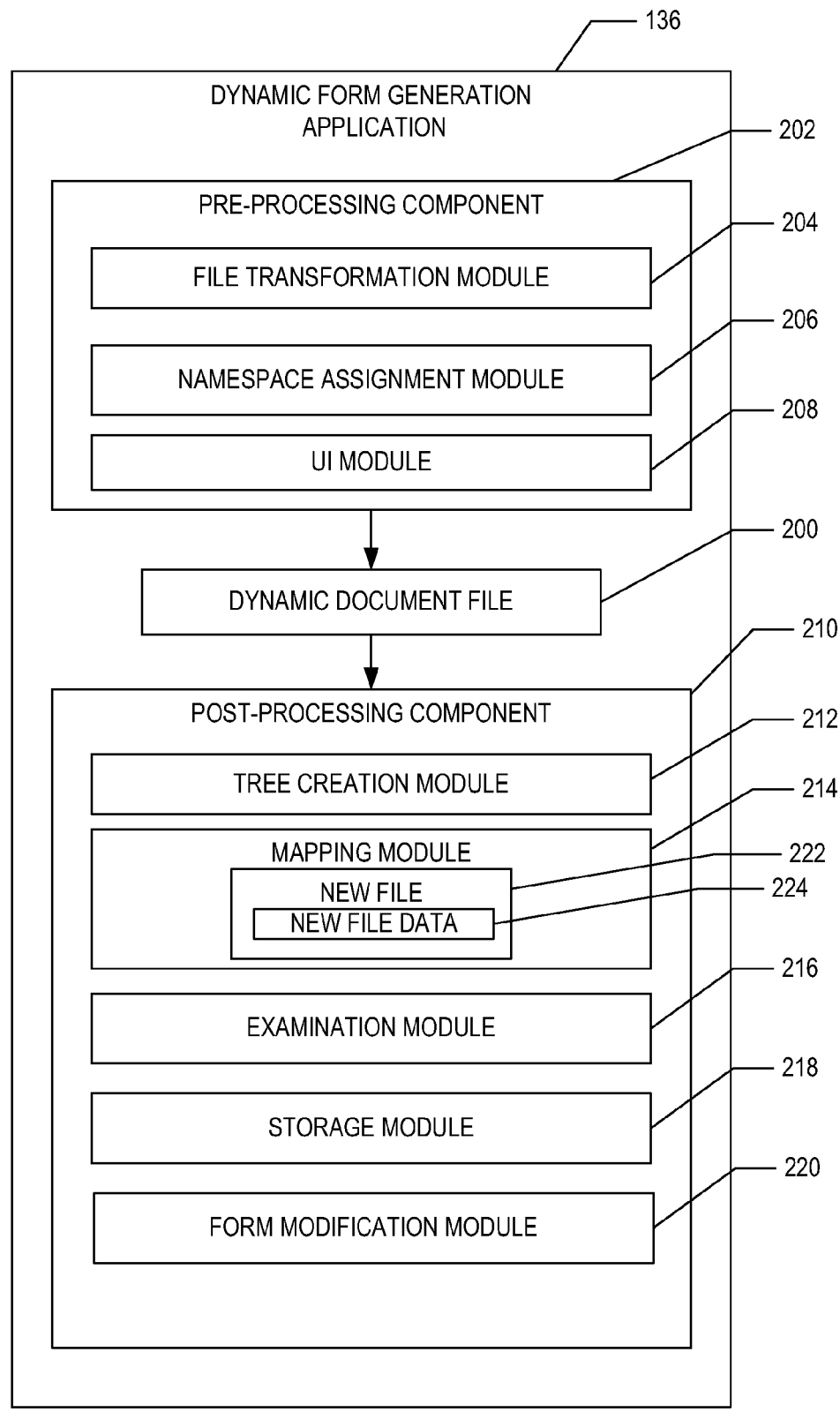
FIG. 2A is a block diagram illustrating components of a dynamic form generation application according to one aspect of a dynamic form generation system.

The user system application 110 includes one or more processors to process user input to generate the form request 118 and to process a dynamic document file to display a dynamic form FIG. 2A illustrates an exemplary dynamic form generation application 136 according to one aspect of the dynamic form generation system 100. In this aspect, the form generation application 136 is a transformation file, such as an XSLT file, that retrieves file data 130 from an XML file (e.g., XML file 132) to create a dynamic document file 200. Each dynamic form 128 offered by a particular web site may be associated with a different dynamic form generation application 136, and the appropriate dynamic form generation application 136 is identified from data included in the form request 118 received from the user system 106. For example, the form request 118 may include a location (e.g., URL) of the dynamic form generation application 136 that is associated with a desired dynamic form 128.

The dynamic form generation application 136 receives the form request 118. In response, a pre-processing component 202 executes one or more programming modules to create the dynamic document file 200 and preprocess file data 130 associated with the dynamic document file 200. For example, the pre-processing component 202 executes a file transformation module 204 to retrieve file data 130 referenced in the dynamic document file 200 from the memory 134. The file transformation module 204 can use XSLT code to retrieve or extract file data 130 from an XML file 132 to create the dynamic document file 200. Examples of the XML file and XSLT code are shown in Examples 2 and 3 of the Appendix, respectively.

An expanded XML file 132 is shown in Example 4 of the Appendix. In Example 4, a parent <semester> element has been added to the School_Content.xml file shown in Example 2. Furthermore, embedded under the <semester> tag are additional XML child elements, such as the <term>, <year>, and <classInfo> that provide additional detail about a particular semester for a particular student. The XML file 132 in Example 4 also includes class information for two semesters. The first semester element contains information about two classes, and the second semester element contains information about one class.

After retrieving the file data 130, the transformation module 204 creates a dynamic document file 200 that includes an input element for each of the XML elements included in the file data 130. For example, the transformation module 204 uses the XSLT code shown in Example 5 of the Appendix to create input elements for every "grade" element in the expanded XML file shown in Example 4. The resulting dynamic document file 200 includes the following HTML code input elements that are associated with each of the <grade> elements under the <classInfo> elements of XML file shown Example 4.

```
<INPUT type="text" name="grade-field" value="A"></INPUT>
<INPUT type="text" name="grade-field" value="B"></INPUT>
<INPUT type="text" name="grade-field" value="A"></INPUT>
```

There are no references to the original XML elements in the XML file 132 present in the above input elements. For example, there is no indication of the semester element to which the grade-fields input elements correspond. Thus, now that the dynamic document file 200 includes grade-input elements, it is desirable to map the grade-input element values to the original XML elements from which they were created.

The pre-processing component 202 then executes a namespace assignment module 206 to add contextual information to each of the created input elements in the dynamic document file 200. The namespace assignment module 206 assigns a unique namespace to each of the created input elements so that they can be mapped back to the corresponding elements of the original XML file 132.

In one aspect of the dynamic form generation system 100, the namespace assignment module 206 employs an XSLT template to dynamically embed a unique namespace for each created input element that corresponds to the name of an XPath that identifies the portion of the XML file 132 where the corresponding XML element is located. XPath is an expression language for addressing portions of an XML document, or for computing values (strings, numbers, or boolean values) based on the content of an XML document. XPath is based on a tree representation of the XML document, and provides the ability to navigate around the tree. For example, the namespace assignment module 206 executes the code shown in Example 6 of the Appendix to embed the unique namespace for each of the created grade input elements and to produce a document object model ("DOM") that comprises the HTML code shown in Example 7 of the Appendix. A call to the "inow_nameAttribute" template in Example 6 results in the insertion of unique namespaces into the "INOW_NAME" attribute of the <INPUT> tag associated with each of the grade input elements as shown in Example 7. For example, the INOW_NAME="schoolInfo__1/semester__2/class Info 1/grade_I/" value="A" I> shown in Example 7 corresponds to the XPath:

```
<semester>
    <term>Spring</term>
    <year>1996</year>
    <classInfo>
        <id>Math205</id>
        <description>Applied Matrix Theory</description>
        <grade>A</grade>
```

The DOM shown in Example 7 describes the structure of dynamic HTML and XML documents in such a way that allows them to be manipulated through a web browser (e.g., the user system application 110). The INOW_NAME attribute name is arbitrary, and any attribute name could be used as long as it does not match an existing HTML attribute already in use.

The "inow_nameAttribute" shown in Example 7 is a recursive function that takes as an input argument the parameter "xpath_name". This xpath_name parameter corresponds to the particular element being selected from the XML file 132. In Example 7, the parameter corresponds to the <grade> element.

Upon execution, the namespace assignment module 206 recursively examines the XPath of the each XML element in the XML file 132 to determine its ancestry. For example, the namespace assignment module 206 determines the number of nested elements associated with a particular parent element. The namespace assignment module 206 then annotates the level of nesting of each of the parent elements with a particular number (e.g., "_#") and then inserts a new attribute into the <INPUT> tag called INOW_NAME. For example, in Example 7, "schoolInfo__1" denotes the first <schoolInfo> element in the XML file, "semester2" denotes the second <semester> element from within "schoolInfo__1", "classInfo__1" denotes the first <classinfo> element within "semester 2," and "grade__1" denotes the first <grade> element within "classInfo__1." By inserting the new attributes and annotating the level of nesting of each of the parent elements, the namespace assignment module 206 effectively maps the input elements of the dynamic document file 200 back to the original XML elements of the XML file 132 shown in Example 4.

The pre-processing component 202 executes a UI module 208 to transfer the dynamic document file 200 with unique namespaces assigned to each of the input elements to the user system 106. The user system application 110 reads the dynamic document file 200 and displays a dynamic form 128 on the display 122.

Figure 2B:
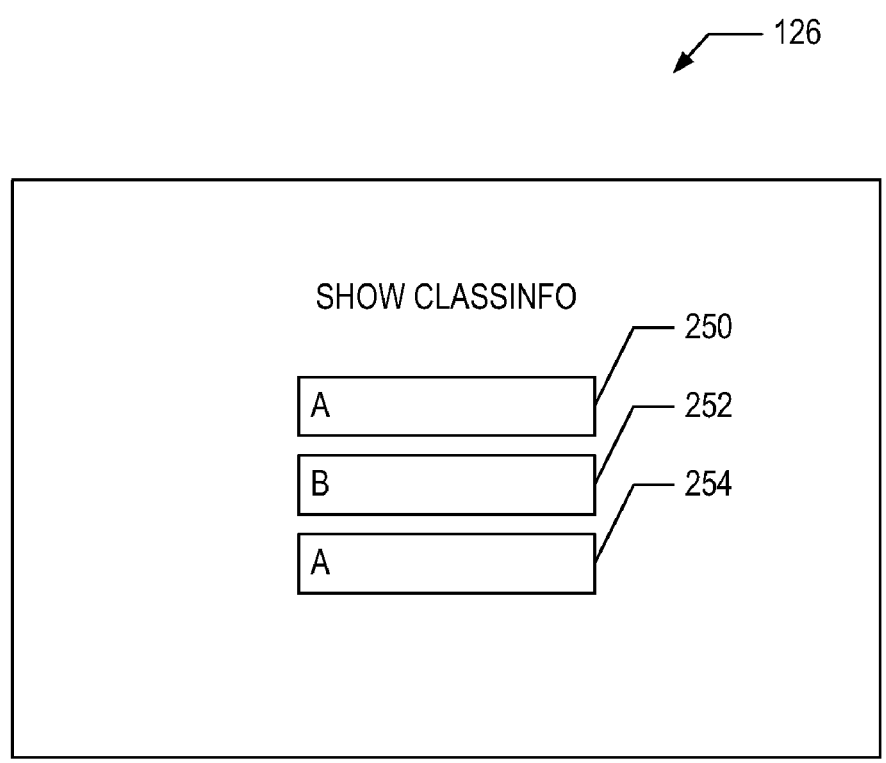
FIG. 2B is a screen shot of a dynamic form.

FIG. 2B is a screen shot of the dynamic form 128 that appears on the display 122 based on a dynamic document file 200 having the HTML code shown in Example 7. In this example, the dynamic form 128 includes a grade input field 250 displaying the data value="A" corresponding to a grade received in Biology during the first semester. The dynamic form 128 also includes a grade input field 252 displaying a data value="B" corresponding to a grade received in Art History during the second semester. The dynamic form 128 also includes and a grade input field 254 displaying a data value="A" corresponding to a grade received in Applied Matrix Theory during the second semester.

Referring again to FIG. 1A, the user 116 uses the UI 120 to interact with file data 130 displayed in the dynamic form 128 on the display 122. For example, the user 116 can use the input device 124 to modify existing file data displayed in input fields on the dynamic form 128. Thereafter, the user 116 uses the input device 124 to select, for example, a "submit" control to generate an update request, as indicated by arrow 140. The update request 140 identifies the updated data and the corresponding input field.

Referring again to FIG. 2A, the dynamic form generation application 136 receives an update request 140 from the user system 106. In response, a post-processing component 210 executes one or more modules to perform post-processing operations on file data 130 associated with the dynamic document file 200.

The post-processing component 210 executes a tree creation module 212 to create a tree structure that comprises a hierarchy of input elements based on the DOM created by the namespace assignment module 206. In other words, the tree structure represents an XPath for each of the INOW_NAME namespace attributes.

Figure 3:
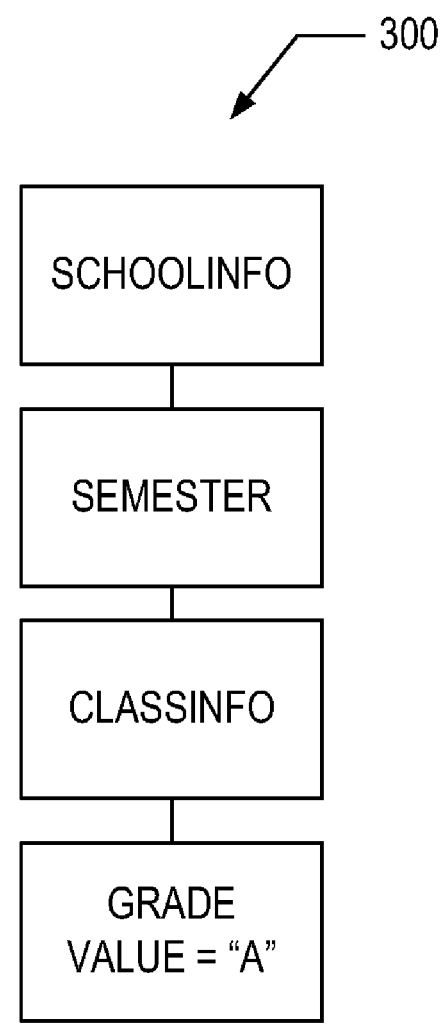
FIGS. 3-5 depicts tree structures created by a dynamic form generation application according to one aspect of a dynamic form generation system.
Figure 4:
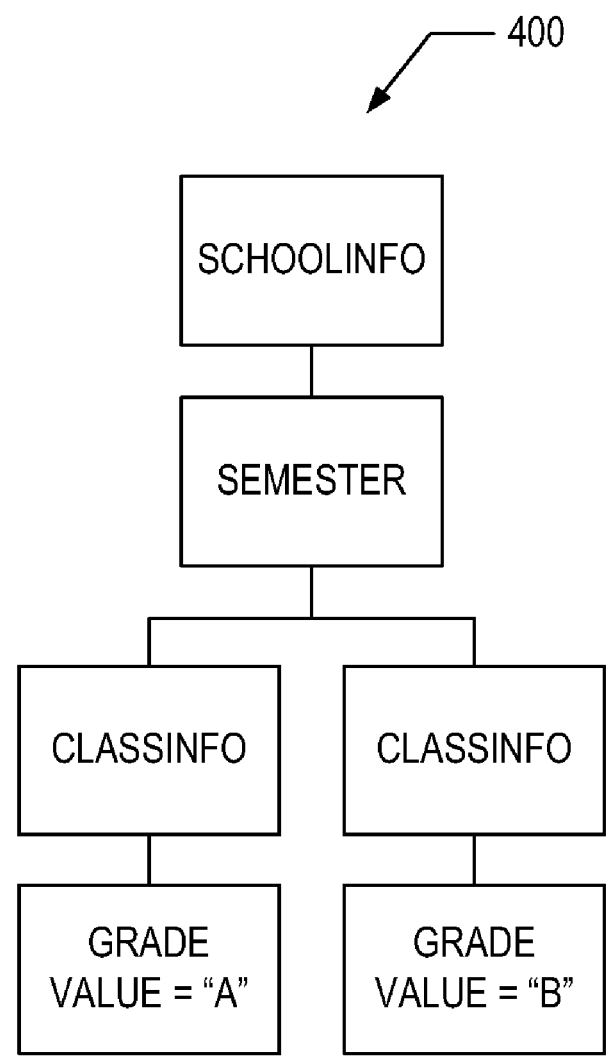
Figure 5:
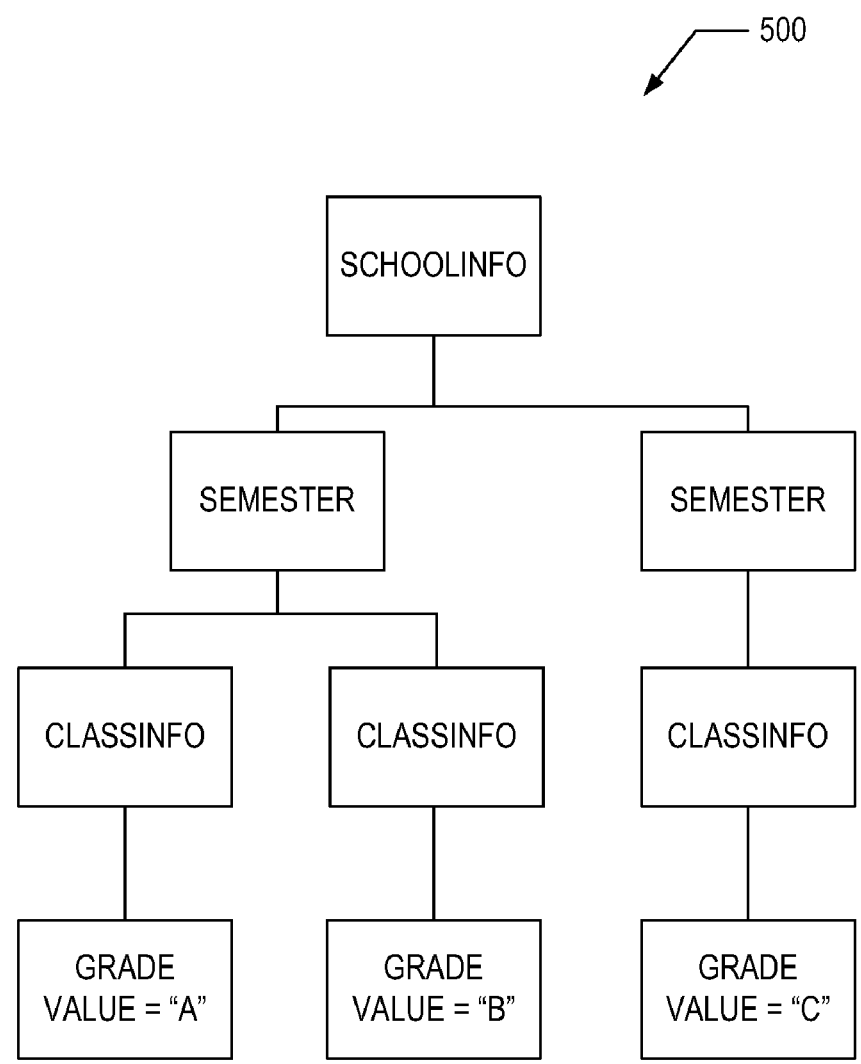

For example, FIG. 3 depicts a first tree structure 300 created after examining the first INOW_NAME attribute shown in Example 7 (i.e., "INOW_NAME="schoolInfo 1/semester 1/classInfo_I/grade_I/" value="A" I>"). FIG. 4 depicts a modified tree structure 400 created after examining the second INOW_NAME attribute shown in Example 6 (i.e., "INOW_NAME="school Info__/1semester__1classInfo__2/grade__1/" value="B" />"). As can be seen in FIG. 4, the tree structure 400 is a modification of the tree structure 300 shown in FIG. 3. The tree structure 400 is modified to include the new instance of "classinfo." FIG. 5 depicts the final tree structure created after examining the last INOW_NAME attribute shown in Example 6 (i.e., "INOW_NAME="schoolInfo__1/semester__2/classinfo__1/grade__1/" value="C" I>"). In this instance, the user 116 used the UI 120 to change the value of the grade element that corresponds to spring semester grade in Math 205 from an "A" to a "C."

Referring back to FIG. 2A, after the final tree structure (e.g., final tree structure 500) is created, the post-processing component 210 executes a mapping module 214 to create a new XML file 222 based on the final tree structure. For example, the mapping module 214 creates a new XML file that comprises new XML file data 224, such as shown in Example 8 of the Appendix based on the tree structure illustrated in FIG. 5.

The post-processing component 210 executes an examination module 216 to compare file data 130 included in the original XML file 132 to the new XML file data 224. The examination module 216 examines each XPath in the original XML file data 130 to determine if there is an occurrence of a corresponding XPath in the new XML file data 224. By comparing the new XML file data 224 shown in Example 8 to the original XML file data 130 shown in Example 4, it can be seen that that some of the elements included in the original XML file data 130 are missing from the new XML file data 224. For example, the examination module 216 reads the first XPath from the original XML file data 130 shown in Example 4, which corresponds to the advisor element. This information is missing in the new XML file data 224 because the XSL code (e.g., Example 6) used to retrieve the original XML file data 130 did not include any calls to retrieve this information from the original XML file 132. In this example, after comparing the original XML file data 130 to the new XML file data 224, the examination module 216 determines that the following path does not exist in the new XML file data 224.

```
<schoolInfo>
    <advisor>
        <name>
            <first>John</first>
```

The examination module 216 then modifies the new XML file data 224 to include the missing path information. For example, after determining the above path does not exist in the new XML file data 224, the examination module 216 modifies the new XML file data 224 to include the data shown in Example 9 of the Appendix. The examination module 216 continues comparing the original XML file data 130 to the new XML file data 224 and inserting missing the path information until the new XML file data 224 includes each path included in the original XML file data 224. However, the examination module 216 does not change the value of elements included in the new XML file data to match the value of elements included the original XML file data 130. Example 10 of the Appendix shows the new XML file data 224 generated by the examination module 216 after comparing the new XML file shown in Example 8 to the original XML file shown in Example 4. Thereafter, the post-processing component 210 executes a storage module 218 that replaces the original XML file data 130 in the XML file 132 with the new XML file data 224.

It is often desirable to design a dynamic form 128 that adjusts the number of fields displayed in the dynamic form 128 based on the amount of file data associated with a particular XML file 132 from which file data 130 is being retrieved. According to one aspect of the dynamic form generation system 100, a dynamic form 128 is displayed on the display 122, and the number of fields displayed in the dynamic form 128 is modified based on the amount of file data being added or removed from the particular XML file 132.

For example, after the user uses the UI 120 to modify file data 130 displayed in the dynamic form 128, the post-processing component 210 executes a form modification module 220 to modify the appearance of the form 128 on the display 122. Example 11 of the Appendix shows an example of an XSLT file used to define the dynamic form 600 shown in FIG. 6. The XSLT file of Example 11 does not include the "inow nameAttribute" template. However, the "inow nameAttribute" template will be embedded by the pre-processing component 202 in response to the form request 118 received from the user system 106.

Figure 6:
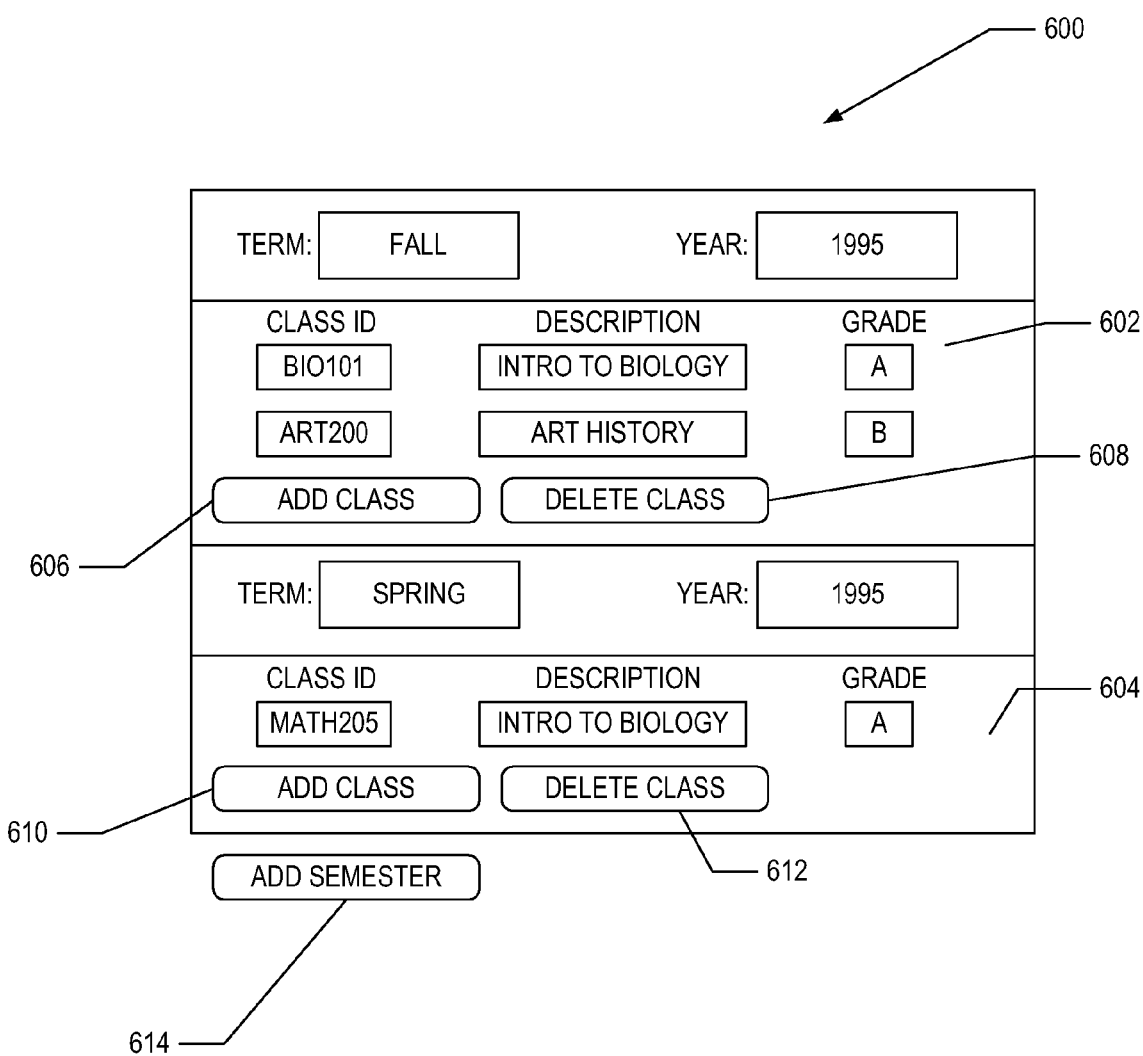
FIG. 6 is a screen shot of another dynamic form.

In Example 11, the XSLT file creates the dynamic document file 200 by reading data from the XML file of Example 4. The form transformation module 204 transfers the dynamic document file 200 to the user system 106. The user system application 110 reads the dynamic document file 200 and displays the dynamic form 600 on the display 122. The dynamic form 600 includes a table for each semester. Thus, the dynamic form 600 includes a fall table 602 and a spring table 604. Inside each semester table, there is a row for each class. Each class row has three columns that correspond to "class id", "description", and "grade." As depicted in FIG. 6, the dynamic form 600 includes an add class control 606, a delete class control 608 associated with the fall semester, a different add class control 610, and a different delete class control 612 associated with the spring semester. The dynamic form 600 also includes a semester control 614.

Referring again to FIG. 1A, the user 116 can use the UI 120 to interact with the various controls displayed on the dynamic form 600. For example, the user can use the input device 124 to select the add class controls 606, 610 or add semester control 614 to generate a form insertion request, as indicated by arrow 142. Alternatively, the user can use the input device 124 to select the delete class controls 608, 612 to generate a form deletion request, as indicated by arrow 144.

Referring back to FIG. 2A, the dynamic form generation application 136 receives the form insertion request 142 from the user system 106 generated, for example, in response to the user 116 selecting the add semester control 614. The dynamic form generation application 136 then executes the form modification module 220 to insert a new semester table into the dynamic form 600. For example, the form modification module 220 uses the following repeat attribute that has been added to HTML elements shown in Example 11 of the Appendix to facilitate the insertion of a new semester table into the dynamic form 128.

```
<TR repeat="semester">
```

The "repeat" attribute is an arbitrary name. The value "semester" is used to identify the portion of the HTML to be repeated. The add semester control 614 is defined, for example, by the following code.

```
<INPUT type="button" value="Add Semester"
    repeat="semester"><INPUT>
```

As can be seen, the HTML code that defines the semester control also includes a "repeat" attribute with a value "semester." The form modification module 220 parses the HTML code to identify another HTML element with a matching repeat value. In the example above, the matching repeat value is "semester." The form modification module 220 copies the identified HTML element and then adds the identified HTML element to the repeat element's parent. This modified DOM now includes a new "semester" row. After the new semester element is added, the form modification module 220 assigns a new, unique namespace to each of the new <INPUT> fields created during the repeat operation. For example, if there are currently three semesters existing in the XSL file, then the <INPUT> INOW_NAME attribute is assigned the next value in the sequence, INOW_NAME=/schoolInfo 1/semester_4.

Alternatively, the dynamic form generation application 136 receives a form deletion request 144 from the user system 106 generated, for example, in response to the user 116 selecting the delete control 610 to delete a "classinfo" row that corresponds to a particular class from the fall table 604. In response to the received deletion request 144, the dynamic form generation application 136 executes the form modification module 220 to delete the classinfo row that corresponds to the particular class in the fall table 604. For example, the form modification module 220 uses unique delete attributes that have been added to HTML elements shown in Example 11 of the Appendix.

```
<TR repeat="classinfo" delete="classinfo">
```

The "delete" attribute is an arbitrary name. The value "classinfo" is used to identify the portion of the HTML to be deleted. The delete control is defined, for example, by the following code.

```
<INPUT type="button" value="Delete Class"
    delete="classinfo"></INPUT>
```

As can be seen, the HTML code that defines the semester control also includes a "delete" attribute with a value "classinfo." After the user selects a delete class control (e.g. 610 or 614), the form modification module 220 parses the HTML code to identify another HTML element with a matching delete value. The form modification module 220 then deletes the identified HTML element from the DOM.

Figure 7:
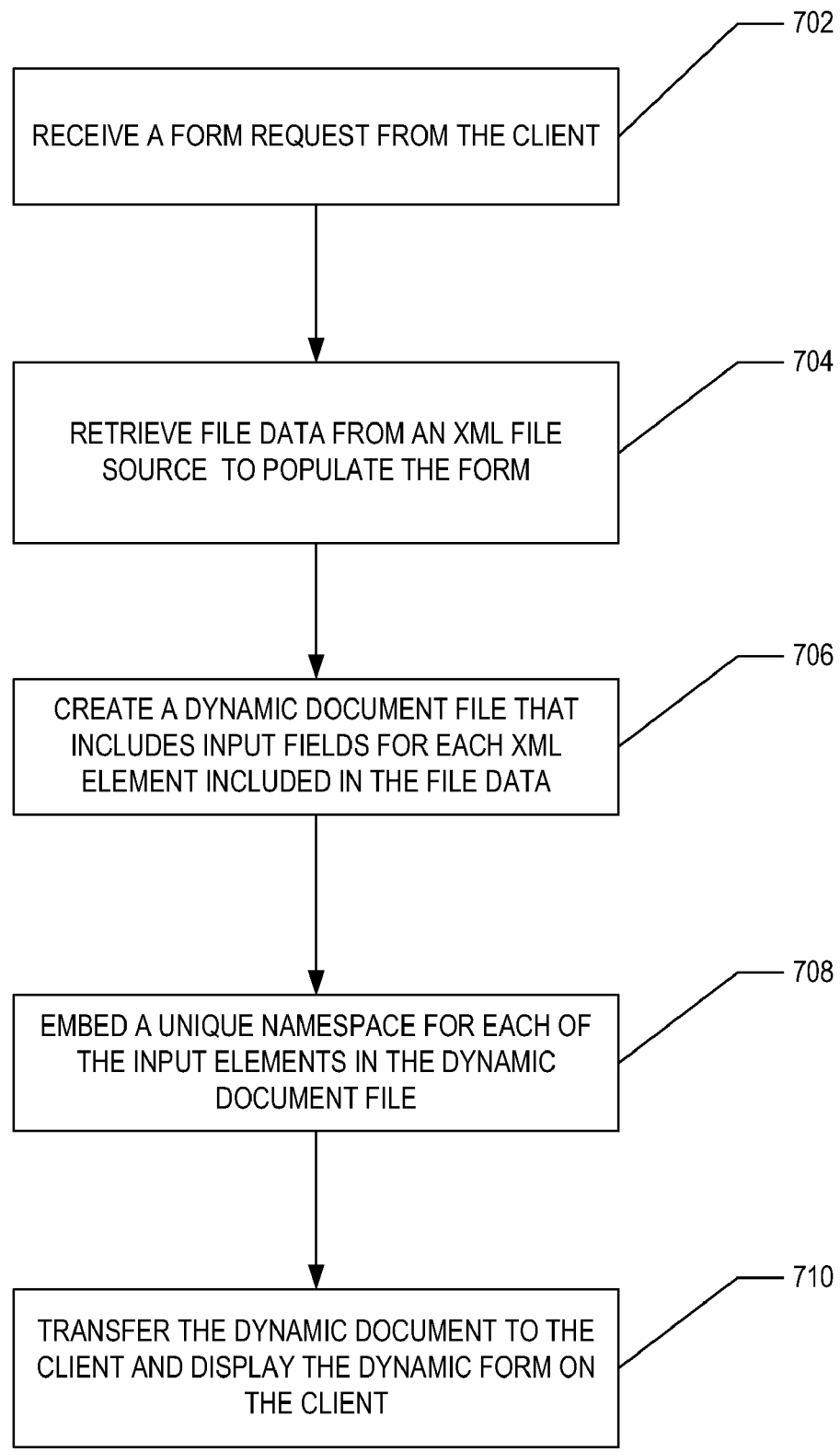
FIG. 7 is a flow chart illustrating a method for creating a dynamic document file and preprocessing file data associated with a dynamic document file according to one aspect of a dynamic form generation system.

FIG. 7 illustrates a method for creating a dynamic document file 200 and preprocessing file data 130 associated with the dynamic document file 200. At step 702, a form request 118 is received from a user system 106 requesting the retrieval of a dynamic document file 200 that defines a desired dynamic form 128 from a web site 114. The dynamic form generation application 136 retrieves file data 130 from an external file source, such as an XML file 132, in response to the received form request 118 at step 704. At step 706, the dynamic form generation application 136 creates the dynamic document file 200 that includes input elements for each XML element included the file data 130. The dynamic form generation application 136 dynamically embeds a unique namespace for each of the input element in the dynamic document file 200 at step 708. At step 710, the dynamic form generation application 136 transfers the dynamic document file 200 to the user system 106, and the user system application 110 reads the dynamic document file 200 and displays the dynamic form on the display 122. The displayed dynamic form 128 includes input fields that correspond to each of the input elements in the dynamic document file 200.

Figure 8:
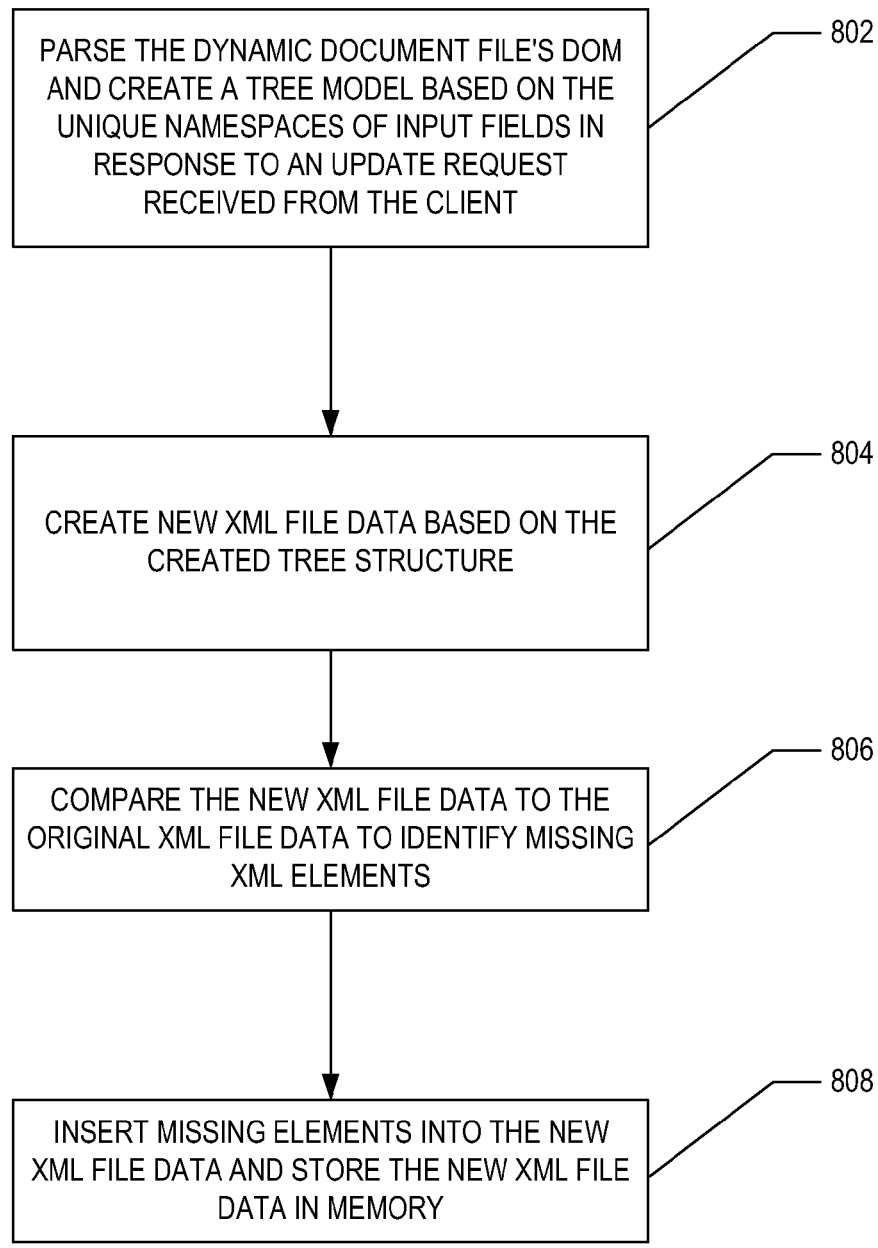
FIG. 8 is a flow chart illustrating a method for post-processing updates to data displayed in the input fields of a dynamic form according to one aspect of a dynamic form generation system.

FIG. 8 illustrates a method for post-processing data entered into an input field of a dynamic form 128 by a user. At step 802, the dynamic form generation application 136 receives an update request 140 from the user system 106, and, in response, parses the dynamic document file's DOM and uses unique namespaces assigned to the input elements to create a tree model. As described above, the input element values in the tree model includes data values that were entered into the corresponding input fields of the dynamic form 128 by the user 116. The dynamic form generation application 136 creates new XML file data 224 based on the created tree structure at 804. At step 806, the dynamic form generation application 136 compares the new XML file data 224 to the original XML file data 130 to identify missing XML elements. The dynamic form generation application 136 inserts missing elements into the new XML file data 130 and stores the new XML file data 130 in the XML file 132 from which original file data 130 was retrieved at 808.

In operation, the server 104 executes computer-executable instructions, such as those illustrated in the FIGS. 7 and 8 to implement aspects of the dynamic form generation system 100.

The order of execution or performance of the operations in aspects of the dynamic form generation system 100 illustrated herein may be different.

Embodiments of the dynamic form generation system 100 may be implemented with computer-executable instructions. The computer-executable instructions may be organized into one or more computer-executable components or modules. Embodiments of the dynamic form generation system 100 may be implemented with any number and organization of such components or modules. For example, aspects of the dynamic form generation system 100 are not limited to the specific computer-executable instructions or the specific components or modules illustrated in the figures and described herein.

As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX

EXAMPLE 1

```
<HTML>
<BODY>
<FORM METHOD=GET ACTION="http://localhost:8102">
    <H1>Class Information Form</H1>
    Advisor First Name
        <INPUT type="text"' name="advisor-first-name"
        value="John"></INPUT><br>
    Advisor Last Name
        <INPUT type="text" name="advisor-last-name"
value="Smith"></INPUT><br>
    Student First Name
        <INPUT type="text" name="student-first-name"
        value="Marty'"></INPUT><br>
    Student Last Name
        <INPUT type="text" name="student-last-name"
value="Jones"></INPUT><br>
    <INPUT TYPE=submit VALUE= "Do Search"></INPUT>
    <FORM >
</FORM>
</BODY>
</HTML>
```

EXAMPLE 2

```
<schoolInfo>
    <advisor>
        <name><first>John</first> last>Smith</last></name>
    </advisor>
    <student>
        <name><first>Marty</first><last>Jones</last> </name>
    </student>
</schoolInfo>
```

EXAMPLE 3

```
Advisor First Name
    <INPUT type="text" name="advisor-first-name"> <xsl:attribute
    name="value"> <xsl:value-of
    select="/schoolInfo/advisor/name/first"/>
        </xsl:attribute>
    </INPUT><br>
Advisor Last Name
    <INPUT type="text" name="advisor-last-name" >
        <xsl:attribute name="value"> <xsl:value-of
    select="/schoolInfo/advisor/name/last"1>
        </xsl:attribute>
    </INPUT><br>
Student First Name
    <INPUT type="text" name="student-first-name" >
        <xsl:attribute name="value"> <xsl:value-of
    select="/schoolInfo/student/name/first"/>
        </xsl:attribute>
    </INPUT><br>
Student Last Name
    <INPUT type="text" name="student-last-name" >   <xsl:attribute
    name="value">
    <xsl:value-of select="/schoolInfo/student/name/last"/>
```

```
        </xsl:attribute>
    </INPUT><br>
```

EXAMPLE 4

```
<schoolInfo>
    <advisor>
        <name><first>John</first><last>Smith</last></name>
    </advisor>
    <student>
        <name><first>Marty</first> <last>Jones</last> </name>
    </student>
    <semester>
        <term>Fall</term>
        <year>1995</year>
        <classInfo>
            <id>Bio102</id>
            <description>Intro to Biology</description>
            <grade>A</grade>
        </classInfo>
        <classInfo>
            <id>Art200</id>
            <description>Art History</description>
            <grade>B</grade>
        </classInfo>
    </semester>
    <semester>
        <term>Spring</term>
        <year>1996</year>
        <classInfo>
            <id>Math205</id>
            <description>Applied Matrix Theory</description>
            <grade>A</grade>
        </classInfo>
    </semester>
</schoolInfo>
```

EXAMPLE 5

```
<xsl:for-each select="./classInfo">
    <INPUT type="text" name="grade-field">
        <xsl:attribute name="value"><xsl:value-of
        select="grade"/> </xsl:attribute>
    </INPUT>
<xsl:for-each>
```

EXAMPLE 6

```
<?xml version="1.0" encoding="ISO-8859-1"?> <xsl:stylesheet
version="1.0"
xmlns:xsl="http://www.w3.org/1999/XSL/Transform"> <xsl:template
match="/">
    <html>
    <body>
    <form>
    <H2>show classInfo </H2><br></br>
<xsl:for-each select="/schoolInfo/semester/classInfo">
    <INPUT type="text" >
        <xsl:call-template name="inow_nameAttribute">
            <xsl:with-param name="xpath_name"
            select="grade"/> </xsl:call-template>
        <xsl:attribute name="value"><xsl:value-of
        select="grade"/> </xsl:attribute>
    </INPUT><BR></BR>
</xsl:for-each>
    </form>
    </body>
    </html>
</xsl:template>
<xsl:template name="inow_nameAttribute">
    <xsl:param name="xpath_name"/>
        <xsl:attribute name="1NOW_NAME">
            <xsl:for-each select="$xpath_name">
                <xsl:for-each
select="ancestor-or-self::*"> <xsl:value-of
select="name( )"/><xsl:text>_</xsl:text><xsl:number level="multiple"/>
                    <xsl :text>/</xsl:text>
                </xsl:for-each>
            </xsl:for-each> </xsl:attribute>
</xsl:template>-
<xsl:stylesheet>
```

EXAMPLE 7

```
<html>
 <body>
  <form>
    <H2>show classInfo</H2>
    <br/>
    <INPUT type="text"
INOW_NAME="schoolInfo_1/semester_1/classInfo_1/grade_1/"
value="A" /> <BR />
    <INPUT type="text"
INOW_NAME="schoolInfo_1/semester_1/classInfo_2/grade_1/"
value ="B" /> <BR />
    <INPUT type="text"
INOW_NAME="schoolInfo_1/semester_2/classInfo_1/grade_1/"
value="A" /> <BR />
  </form>
 </body>
</html>
```

EXAMPLE 8

```
<schoolInfo>
    <semester>
        <classInfo>
            <grade> A </grade>
        <classInfo>
        <classInfo>
            <grade> B </grade>
        <classInfo>
    </semester>
    <semester>
        <classInfo>
            <grade> C </grade>
        <classInfo>
    </semester>
</schoolInfo>
```

EXAMPLE 9

```
<schoolInfo>
    <advisor>
```

```
            <name>
                 <first>John</first>
            </name>
       </advisor>
       <semester>
            <classInfo>
                 <grade> A </grade>
            <classInfo>
            <classInfo>
                 <grade> B </grade>
            <classInfo>
       </semester>
       <semester>
            <classInfo>
                 <grade> C </grade>
            <classInfo>
       </semester>
</schoolInfo>
```

EXAMPLE 10

```
<schoolInfo>
       <advisor>
            <name>
                 <first>John</first>
                 <last>Smith</last>
            </name>
       </advisor>
```

```
       <student>
            <name>
                 <first>Marty</first>
                 <last>Jones</last>
            </name>
       </student>
       <semester>
            <term>Fall</term>
            <year>1995</year>
            <classInfo>
                 <id>Bio102</id>
                 <description>Intro to Biology</description>
                 <grade>A</grade>
            </classInfo>
            <classInfo>
                 <id>Art200</id>
                 <description>Art History</description>
                 <grade>B</grade>
            </classInfo>
       </semester>
       <semester>
            <term>Spring</term>
            <year>1996</year>
            <classInfo>
                 <id>Math205</id>
                 <description>Applied Matrix Theory</description>
                 <grade>C</grade>
            </classInfo>
       </semester>
</schoolInfo>
```

EXAMPLE 11

```
<?xml version="1.0" encoding="ISO-8859-1"?>
<xsl:stylesheet version="1.0" xmlns:xsl="http://www.W3.org/1999/XSL/Transform">
<xsl:template match="/"> <html>
 <body>
 <form>
 <H1>Show Semester Info </H1><br></br>
<TABLE >
  <TR repeat="semester">
     <TD>
       <TABLE width="100%" border="2" name="semester">
<xsl:for-each select="/schoolInfo/semester">
    <TR>
      <TD>
        <!-- This is the semester info header table-->
        <TABLE width="100%" cellpadding="5" name="semester_header">
          <TR BGCOLOR="YELLOW">
            <TD><b>Term:</b> </T D>
            <TD>
              <INPUT type="text" size="7">
                 <xsl:attribute name="value"><xsl:value-of select="term"/> </xsl:attribute>
              </INPUT> </TD>
            <TD><B>Year:</B></TD>
            <TD WIDTH="100%" align="left">
              <INPUT type="text" size="4">
                 <xsl:attribute name="value"><xsl:value-of select="year"/> </xsl:attribute>
              </INPUT> </TD>
          </TR>
       </TABLE> <!-- end semester_header -->
      </TD>
    </TR>
    <TR >
      <TD>
        <TABLE name="class_info_table">
          <TR>
            <TH>Class ID</TH>
            <TH>Description</TH>
            <TH>Grade</TH>
          </TR>
          <xsl:for-each select="./classInfo">
                 <TR repeat="classInfo" delete="classInfo">
                   <TD align="center" >
```

-continued

```
        <INPUT type="text" size="7">
          <xsl:attribute name="value"><xsl:value-of select="id"/> </xsl:attribute>
        </INPUT>
      </TD>
      <TD align="center">
        <INPUT type="text">
          <xsl:attribute name="value">
            <xsl:value-of select="description"/>
          </xsl:attribute>
        </INPUT>
      <TD>
      <TD align="center">
        <INPUT type="text" size="2">
          <xsl:attribute name="value"><xsl:value-of select="grade"/> </xsl:attribute>
        </INPUT>
      </TD>
    </TR>
  </xsl:for-each>.
  <TFOOT>
    <TR>
      <TD>
        <INPUT type="button" value="Add Class" repeat="classInfo"></INPUT>
      </TD>
      <TD>
                <INPUT type="button" value="Delete Class" delete="classInfo"></INPUT>
      </TD>
    </TR>
  </TFOOT>
  </TABLE> <!-- end class_info_table -->
    </TD>
  </TR>
</xsl:for-each>
</TABLE> <!-- end semester table -->
      </TD>
    </TR>
    <TFOOT>
    <TR>
      <TD>
        <INPUT type="button" value="Add Semester" repeat="semester"></INPUT>
      </TD>
    </TR>
    </TFOOT>
</TABLE>
 </form>
 </body>
 </html>
</xsl:stylesheet>
```

What is claimed is:

1. A method for implementing a dynamic form, the method comprising:

retrieving original file data from a particular file, the original file data comprising at least one data element defining a data value;

creating a dynamic document file comprising at least one input element corresponding to the at least one data element in the original file data;

associating a unique namespace to the at least one input element in the dynamic document file and generating a document object model (DOM) representation of the dynamic document file based on the associated unique namespace of the at least one input element, the dynamic document file with the at least one input element and the associated unique namespace enabling at least one modification of at least one particular input element in the dynamic document file and saving the at least one modification in the dynamic document file, the dynamic document file displayable as the dynamic form;

creating a tree structure based on the DOM in response to an update request, the update request defining a new data value for a particular input field included in the dynamic form, the tree structure defining a hierarchy of the at least one input element based on a determined level of nesting of the at least one data element in the original file data and the new data value identified in the update request;

creating a new file comprising new file data based on the created tree structure, the new file data comprising the new data value;

comparing the new file data to the original file data to identify one or more data elements that are missing from the new file data and modifying the new file data to include the one or more missing data elements; and storing the new file data as modified by the examination module in a memory.

2. The method of claim 1 further comprising retrieving original file data from an extensible Markup Language (XML) file.

3. The method of claim 2 further comprising using an eXtensible Stylesheet Language Transform (XSLT) to retrieve original XML file data from the XML file.

4. The method of claim 1 wherein the dynamic document file comprises a hypertext markup language (HTML) file.

5. The method of claim 1 further comprising dynamically associating the associated unique namespace for the at least one input element in the dynamic document file with an XSLT template.

6. The method of claim 1 further comprising:
   determining the level of nesting of the at least one data element included in the original file data; and
   associating an attribute with a particular value that indicates the determined level of nesting to the at least one input element as the unique namespace.
7. The method of claim 1 further comprising:
   receiving a form addition request identifying a new input field for addition to the dynamic form;
   adding a new input element that corresponds to the new input field to the dynamic document file; and
   associating a second unique namespace to the new input element.
8. The method of claim 1 further comprising:
   receiving a form deletion request identifying at least one input field for deletion from the dynamic form; and
   deleting an input element from the dynamic document file corresponding to the at least one input field identified for deletion.
9. A non-transitory computer readable storage medium encoded with computer-executable instructions executable by at least one processor to:
   retrieve original file data from a particular file, the original file data comprising at least one data element defining a data value;
   create a dynamic document file comprising at least one input element corresponding to the at least one data element in the original file data;
   associate a unique namespace to the at least one input element in the dynamic document file and generate a document object model (DOM) representation of the dynamic document file based on the associated unique namespace of the at least one input element, the dynamic document file with the at least one input element and the associated unique namespace enabling at least one modification of at least one particular input element in the dynamic document file and saving the at least one modification in the dynamic document file, the dynamic document file displayable as the dynamic form;
   create a tree structure based on the DOM in response to an update request, the update request defining a new data value for a particular input field included in the dynamic form, the tree structure defining a hierarchy of the at least one input element based on a determined level of nesting of the at least one data element in the original file data and comprising the new data value identified in the update request;
   create a new file comprising new file data based on the created tree structure, the new file data comprising the new data value;
   compare the new file data to the original file data to identify one or more data elements that are missing from the new file data and modify the new file data to include the one or more missing data elements; and
   store the new file data as modified by the examination module in a memory.
10. The computer readable medium of claim 9 further comprising instructions to retrieve the original file data from an eXtensible Markup Language (XML) file.
11. The computer readable medium of claim 10 further comprising instructions to execute an eXtensible Stylesheet Language Transform (XSLT) code to retrieve the original file data from the XML file.
12. The computer readable medium of claim 9 wherein the dynamic document file comprises a hypertext markup language (HTML) file.
13. The computer readable medium of claim 9 further comprising instructions to execute an eXtensible Stylesheet Language Transform (XSLT) template to dynamically associate the associated unique namespace for the at least one input element in the dynamic document file.
14. The computer readable medium of claim 9 further comprising instructions to:
   determine a level of nesting of the at least one data element included in the original file data; and
   associate an attribute with a particular value that indicates the determined level of nesting to the at least one input element as the associated unique namespace in the dynamic document file.
15. The computer readable medium of claim 9 further comprising instructions to:
   receive a form addition request identifying a new input field for addition to the dynamic form and, in response thereto, add a new input element to the dynamic document file and associate a second unique namespace to the new input element.
16. The computer readable medium of claim 9 comprising instructions to:
   receive a form deletion request identifying at least one input field for deletion from the dynamic form and delete an input element from the dynamic document file corresponding to the at least one input field identified for deletion.
17. A system for implementing a dynamic form, the system comprising:
   at least one processor;
   a pre-processing component executing on the at least one processor to receive a form request, the pre-processing component comprising:
      a file transformation module to retrieve original file data from a particular file, the original file data comprising at least one data element defining a data value, and to create a dynamic document file comprising at least one input element corresponding to the at least one data element in the original file data; and
      a namespace assignment module to associate a unique namespace to the at least one input element in the dynamic document file and to generate a document object model (DOM) representation of the dynamic document file based on the associated unique namespace of the at least one input element, the dynamic document file with the at least one input element and the associated unique namespace enabling at least one modification of at least one particular input element in the dynamic document file and saving the at least one modification in the dynamic document file,
      the dynamic document file displayable as the dynamic form; and
   a post-processing component executing on the at least one processor comprising:
      a tree creation module to create a tree structure based on the DOM in response to an update request, the update request defining a new data value for a particular input field included in the dynamic form, the tree structure defining a hierarchy of the at least one input element based on a determined level of nesting of the at least one data element in the original file data and comprising the data value for the at least one data element and the new data value identified in the update request;
      a mapping module to create a new file comprising new file data based on the created tree structure, the new file data comprising the new data value;

an examination module to compare the new file data to the original file data to identify one or more data elements that are missing from the new file data and to modify the new file data to include the one or more missing data elements; and a storage module to store the new file data as modified by the examination module in a memory.

18. The system of claim 17 wherein the file transformation module retrieves the original file data from an eXtensible Markup Language (XML) file.

19. The system of claim 18 wherein the file transformation module executes an eXtensible Stylesheet Language Transform (XSLT) code to retrieve the original file data from the XML file.

20. The system of claim 17 wherein the dynamic document file comprises a hypertext markup language (HTML) file.

21. The system of claim 17 wherein the namespace assignment module executes an eXtensible Stylesheet Language Transform (XSLT) template to dynamically associate the associated unique namespace for the at least one input element in the dynamic document file.

22. The system of claim 17 wherein the namespace assignment module:
determines the level of nesting of the at least one data element included in the original file data; and
associates an attribute with a particular value that indicates the determined level of nesting to the at least one input element as the associated unique namespace in the dynamic document file.

23. The system of claim 17 further comprising:
a form modification module to receive a form addition request, to add a new input element to the dynamic document file corresponding to a new input field, and to associate a second unique namespace to the new input element.

24. The system of claim 17 further comprising:
a form modification module to receive a form deletion request identifying at least one input field and to delete an input element from the dynamic document file that corresponds to the at least one input field identified for deletion.

25. A computerized system for implementing a dynamic form, the system comprising:
at least one processor;
a pre-processing component executing on the at least one processor to receive a form request, the pre-processing component comprising:
a file transformation module to, in response to the form request, execute transformation code to identify a particular file comprising original file data, the original file data comprising a plurality of data elements each defining a data value, retrieve the original file data, and create a dynamic document file comprising at least one input element corresponding to each data element in the original file data;
a namespace assignment module to associate a unique namespace to each input element in the dynamic document file and to generate a document object model (DOM) representation of the dynamic document file based on the associated unique namespace of each input element, the dynamic document file with the input elements and the associated unique namespaces enabling at least one modification of at least one particular input element and saving the at least one modification in the dynamic document file; and a user interface module to transmit the dynamic document file;
a user system application executable on a user system computer to generate the dynamic form for display based on the dynamic document file, the dynamic form displaying at least one data value in a particular input field;
a user interface to receive a user input comprising a new data value for the particular input field, and wherein the user system application is configured to generate an update request based on the user input; and
a post-processing component executing on the at least one processor comprising:
a tree creation module to create a tree structure based on the DOM, the tree structure defining a hierarchy of the input elements based on a level of nesting of the data elements included in the original file data and comprising the new data value corresponding to the particular input field;
a mapping module to create a new file comprising new file data based on the created tree structure, the new file data comprising the new data value;
an examination module to compare the new file data to the original file data to identify one or more data elements that are missing from the new file data and to modify the new file to include the one or more missing data elements; and
a storage module to store the new file data as modified by the examination module in the particular file.

26. A system for implementing a dynamic form, the system comprising: at least one processor;
a plurality of modules executing on the at least one processor comprising:
a file transformation module to, in response to a form request, execute transformation code to retrieve file data from an extensible markup language (XML) file, the file data comprising data elements that each define a data value, and create a hypertext markup language (HTML) dynamic document file comprising input elements corresponding to the data elements in the file data;
a namespace assignment module to determine a level of nesting of the data elements included in the file data, associate a unique namespace to each input element in the dynamic document file, and generate a document object model (DOM) of the dynamic document file based on the associated unique namespaces of the input elements, each unique namespace comprising an attribute with a value that indicates the determined level of nesting of a corresponding data element, the dynamic document file with the input elements and the associated unique namespaces enabling at least one modification of at least one particular input element in the dynamic document file and saving the at least one modification in the dynamic document file, the dynamic document file displayable as the dynamic form;
a tree creation module to create a tree structure based on the DOM in response to an update request, the update request defining a new data value for a particular input field included in the dynamic form, the tree structure defining a hierarchy of the input elements of the dynamic document file based on the unique namespace of each input element having the attribute with the value, the tree structure comprising the new data value for the particular input field;

a mapping module to create a new XML file comprising new file data based on the created tree structure, the new file data comprising the new data value;

an examination module to compare the new file data to the file data to identify one or more data elements that are missing from the new file data and modify the new file data to include the one or more missing data elements; and a storage module to store the new file data as modified by the examination module in a memory.

27. The system of claim 26 further comprising a form modification module to receive another request and modify the at least one particular input element in the dynamic document file in response to the other request.

28. The system of claim 27 wherein the other request comprises a form addition request identifying a new input field for addition to the dynamic form and, in response thereto, the form modification module adds the at least one particular input element to the dynamic document file and associates a second unique namespace to the at least one particular input element, the second unique namespace comprising a second attribute with a second value that indicates a second level of nesting of the new input field relative to the determined level of nesting.

29. The system of claim 27 wherein the other request comprises a form deletion request identifying at least one input field for deletion from the dynamic form and the form modification module deletes the at least one particular input element from the dynamic document file corresponding to the at least one input field identified for deletion.

30. The system of claim 26 wherein the storage module replaces the XML file with the new XML file.

31. A method for implementing a dynamic form, the method comprising:

in response to a form request, executing transformation code to retrieve file data from an extensible markup language (XML) file, the file data comprising data elements that each define a data value, and creating a hypertext markup language (HTML) dynamic document file comprising input elements corresponding to the data elements in the file data;

determining a level of nesting of the data elements included in the file data, associating a unique namespace to each input element in the dynamic document file, and generating a document object model (DOM) of the dynamic document file based on the associated unique namespaces of the input elements, each unique namespace comprising an attribute with a value that indicates the determined level of nesting of a corresponding data element, the dynamic document file with the input elements and the associated unique namespaces enabling at least one modification of at least one particular input element in the dynamic document file and saving the at least one modification in the dynamic document file, the dynamic document file displayable as the dynamic form;

creating a tree structure based on the DOM in response to an update request, the update request defining a new data value for a particular input field included in the dynamic form, the tree structure defining a hierarchy of the input elements of the dynamic document file based on the unique namespace of each input element having the attribute with the value, the tree structure comprising the new data value for the particular input field;

creating a new XML file comprising new file data based on the created tree structure, the new file data comprising the new data value;

comparing the new file data to the file data to identify one or more data elements that are missing from the new file data and modifying the new file data to include the one or more missing data elements; and storing the new file data as modified by the examination module in a memory.

32. The method of claim 31 further comprising upon receipt of another request, modifying the at least one particular input element in the dynamic document file in response to the other request.

33. The method of claim 32 wherein the other request comprises a form addition request identifying a new input field for addition to the dynamic form and the method comprises:

in response to the form addition request, adding the at least one particular input element to the dynamic document file; and associating a second unique namespace to the at least one particular input element, the second unique namespace comprising a second attribute with a second value that indicates a second level of nesting.

34. The method of claim 32 wherein the other request comprises a form deletion request identifying at least one input field for deletion from the dynamic form and the method comprises deleting the at least one particular input element from the dynamic document file corresponding to the at least one input field identified for deletion.

35. The method of claim 31 wherein storing the new file data comprises replacing the XML file with the new XML file.

36. A non-transitory computer readable storage medium encoded with computer-executable instructions executable by at least one processor to:

in response to a form request, execute transformation code to retrieve file data from an extensible markup language (XML) file, the file data comprising data elements that each define a data value, and create a hypertext markup language (HTML) dynamic document file comprising input elements corresponding to the data elements in the file data;

determine a level of nesting of the data elements included in the file data, associate a unique namespace to each input element in the dynamic document file, and generate a document object model (DOM) of the dynamic document file based on the associated unique namespaces of the input elements, each unique namespace comprising an attribute with a value that indicates the determined level of nesting of a corresponding data element, the dynamic document file with the input elements and the associated unique namespaces enabling at least one modification of at least one particular input element in the dynamic document file and saving the at least one modification in the dynamic document file;

create a tree structure based on the DOM in response to an update request, the update request defining a new data value for a particular input field included in the dynamic form, the tree structure defining a hierarchy of the input elements of the dynamic document file based on the unique namespace of each input element having the attribute with the value, the tree structure comprising the new data value for the particular input field;

create a new XML file comprising new file data based on the created tree structure, the new file data comprising the new data value;

compare the new file data to the file data to identify one or more data elements that are missing from the new file data and modify the new file data to include the one or more missing data elements; and store the new file data as modified by the examination module in a memory.

37. The computer readable medium of claim 36 further comprising instructions to receive another request and modify the at least one particular input element in the dynamic document file in response to the other request.

38. The computer readable medium of claim 37 wherein the other request comprises a form addition request identifying a new input field for addition to the dynamic form and the computer readable medium further comprises instructions to add the at least one particular input element to the dynamic document file and associate a second unique namespace to the at least one particular input element, the second unique namespace comprising a second attribute with a second value that indicates a second level of nesting of the new input field relative to the determined level of nesting.

39. The computer readable medium of claim 37 wherein the other request comprises a form deletion request identifying at least one input field for deletion from the dynamic form and the computer readable medium further comprises instructions to delete the at least one particular input element from the dynamic document file corresponding to the at least one input field identified for deletion.

40. The computer readable medium of claim 36 further comprising instructions to replace the XML file with the new XML file.

* * * * *